US005191704A

United States Patent [19]

McCarty

[11] Patent Number: 5,191,704

[45] Date of Patent: Mar. 9, 1993

[54] INSULATING INDUSTRIAL DOOR MANUFACTURING METHOD

[75] Inventor: Lon H. McCarty, Estacada, Oreg.

[73] Assignee: Econo Max Manufacturing, Gresham, Oreg.

[21] Appl. No.: 843,413

[22] Filed: Feb. 27, 1992

Related U.S. Application Data

[62] Division of Ser. No. 638,843, Jan. 8, 1991.

[51] Int. Cl.[5] ........................ B23P 19/00; B23P 25/00

[52] U.S. Cl. .................................. 29/897.32; 29/462; 49/489.1; 52/806; 428/81

[58] Field of Search ..................... 29/897, 897.32, 462; 49/368, 388, 397, 488, 501; 52/456, 455, 309.4, 309.7, 309.8, 309.9, 785, 806, 809, 309.16, 407; 264/46.5, 46.6; 428/71, 81, 312.4, 316.6, 317.9, 326

[56] References Cited

U.S. PATENT DOCUMENTS

| | | | |
|---|---|---|---|
| 2,947,041 | 8/1960 | Imbrecht | 29/897.32 X |
| 3,780,472 | 12/1973 | Biebuyck . | |
| 3,950,894 | 4/1976 | DiMaio . | |
| 3,984,957 | 10/1976 | Piazza . | |
| 4,020,542 | 5/1977 | Slaughter | 29/897.32 X |
| 4,084,347 | 4/1978 | Brown . | |
| 4,236,365 | 12/1980 | Wheeler . | |
| 4,265,067 | 5/1981 | Palmer . | |
| 4,282,687 | 8/1981 | Teleskivi . | |
| 4,550,540 | 11/1985 | Thorn . | |
| 4,716,700 | 1/1988 | Hagemeyer . | |
| 4,738,482 | 4/1988 | Bohm et al. . | |
| 4,837,977 | 6/1989 | Mauro . | |
| 4,850,144 | 7/1989 | Grisham et al. . | |

OTHER PUBLICATIONS

A product brochure for Eliason ® Easy Swing ® High Impact Door.

Product brochures concerning gravity swing doors including: Tec ®-Door; Bar-I-Air ®; Durulite ®; McGuire ®; and Rubbair ® Door.

*Primary Examiner*—Timothy V. Eley

*Attorney, Agent, or Firm*—Klarquist, Sparkman, Campbell, Leigh & Whinston

[57] ABSTRACT

A two way, double action insulating door is described having an insulating core to which is mounted a pair of structural panels. An extruded edge rail is mounted to each edge margin of the core and retains a peripherally-projecting rubber leaf gasket. Preferably the gasket is of a T-shaped cross section and is retained within a slotted edging mounted to the periphery of the door. The door is provided with durable panels covering its exterior faces and also overlaying portions of the edge rail at the edge margins of the door. Optional window assemblies and kick panels are also provided.

11 Claims, 5 Drawing Sheets

INSULATING INDUSTRIAL DOOR MANUFACTURING METHOD

This is a division of application Ser. No. 07/638,843, filed Jan. 8, 1991.

TECHNICAL FIELD

This invention relates to industrial doors and more specifically to doors for use in high traffic areas where insulation is required and drafts are unwanted.

BACKGROUND ART

Insulating doors are generally known and commonly use a foam core as disclosed in U.S. Pat. No. 4,76,700 to Hagemeyer, and U.S. Pat. No. 3,950,894 to DiMaio. These doors, however, are typically not suitable for industrial applications in areas of high traffic flow. Both disclosed doors achieve a seal by closing against a gasketed door jamb This permits them to open only in one direction, making them unsuitable where freely swinging doors are required.

Leaf-style weather stripping is disclosed in U.S. Pat. No. 4,716,700 to Hagemeyer but such weather stripping as disclosed is inadequate to seal a two-way swinging door. The disclosed weather strip is used at the bottom of the door only. The leaf is helo away from the door by a bracket which would present a danger of injury if used on the swinging vertical edge of the door where hands might encounter it. Also, such a bracket is susceptible to breakage if used in an industrial area where carts frequently pass through the door.

One prior swinging door system utilizes a pair of swinging doors. Each door has a thick insulated core section with surface sheets laminated on opposite faces thereof. The surface sheets extend beyond the core in all directions, forming a peripheral gap. An elongated edge cap fills the gap and covers the peripheral edge of the door. The edge cap has a rectangular plug section which extends into the gap between the flanges formed by the surface sheet, and has an outer semicircularly curved portion which forms a bullnose at the edge of the door. The curved portion has a width equal to the overall thickness of the door, whereby a smoothly rounded transition occurs from one side of the door around the edge to the other side of the door. A primary disadvantage of this design is that it requires close tolerances in order to avoid gaps between the edge of the surface sheets and the rounded portion of the edge cap. Also, the edge cap tends to pull free from the door after repeated impact.

Another known insulating door employs an insulated core panel having an elongated rectangular groove formed in the median of the edge of the insulating panel. The core panel is protected by surface sheets. The edge of each surface sheet effectively wraps around an edge of the core panel and is received in the rectangular groove formed therein. A gap remains in the rectangular groove between the inserted surface sheet edges. A flexible blade gasket is inserted in this gap. The inserted portion of the gasket is of check-mark cross section so that it is easier to insert it than to remove it. However, this design does not effectively resist removal when substantial force is employed, as may occur in high traffic industrial areas.

Another known insulated laminated door accommodates an edge gasket by different means. The edge of the door panel of this door is provided with a narrow median gap which communicates with a larger cylindrical cavity formed in the insulated core of the door. The cavity runs along the edge of the door just beneath the edge surface. A flexible gasket having a bead on one edge which is wider than the median gap of the door is received by the cylindrical cavity. The blade portion of the gasket passes through the gap and extends distally from the edge of the door. This door design is difficult to form.

Therefore, a need exists for an improved door construction and method of making doors, particularly insulating type industrial doors.

SUMMARY OF INVENTION

It is an object of the present invention to provide an improved door and door components.

Another object of the invention is to provide an improved door manufacturing method.

It is yet another object of the invention to provide an insulated door that may easily be manufactured without requiring precision fabrication and close tolerances.

It is yet another object of the invention that the door present an attractive, precisely finished appearance.

It is yet another object of the invention to provide the option of a flexible gasket which may be easily removed and replaced and which is securely installed to resist unintended removal.

The invention achieves these and other objects, both individually and collectively, by providing a door with a core having an insulating central panel portion, an edge margin and opposed major surfaces. The door has an elongated edge rail having spaced-apart core engaging flanges defining a core receiving channel therebetween. Face panels are mounted to the surfaces of the core, each face panel overlaying at least a portion of the edge rail.

The invention may also include the feature of having core engaging flanges provided with core gripping elements such as raised ribs. The door may also include an edge rail having a slot for receiving a flexible leaf gasket which extends from the median of the periphery of the door.

The invention further achieves the above objects by providing a method of making a door comprising mounting an edge rail to at least one peripheral edge section core of a door. Face sheets are mounted to the opposite side of the core and extend beyond the edge rail. Excess portions of the face sheet are cut to define the edge of the door. The method may also include the step of further cutting a portion of the face sheets and the edge rail to define the edge of the door. This step may include routing portions of the edge rail and face sheet and may involve changing the angled edge to a nonangled configuration, such as a radius or beveled edge.

DETAILED DESCRIPTION OF A PREFERRED EMBODIMENT

Figure 1:
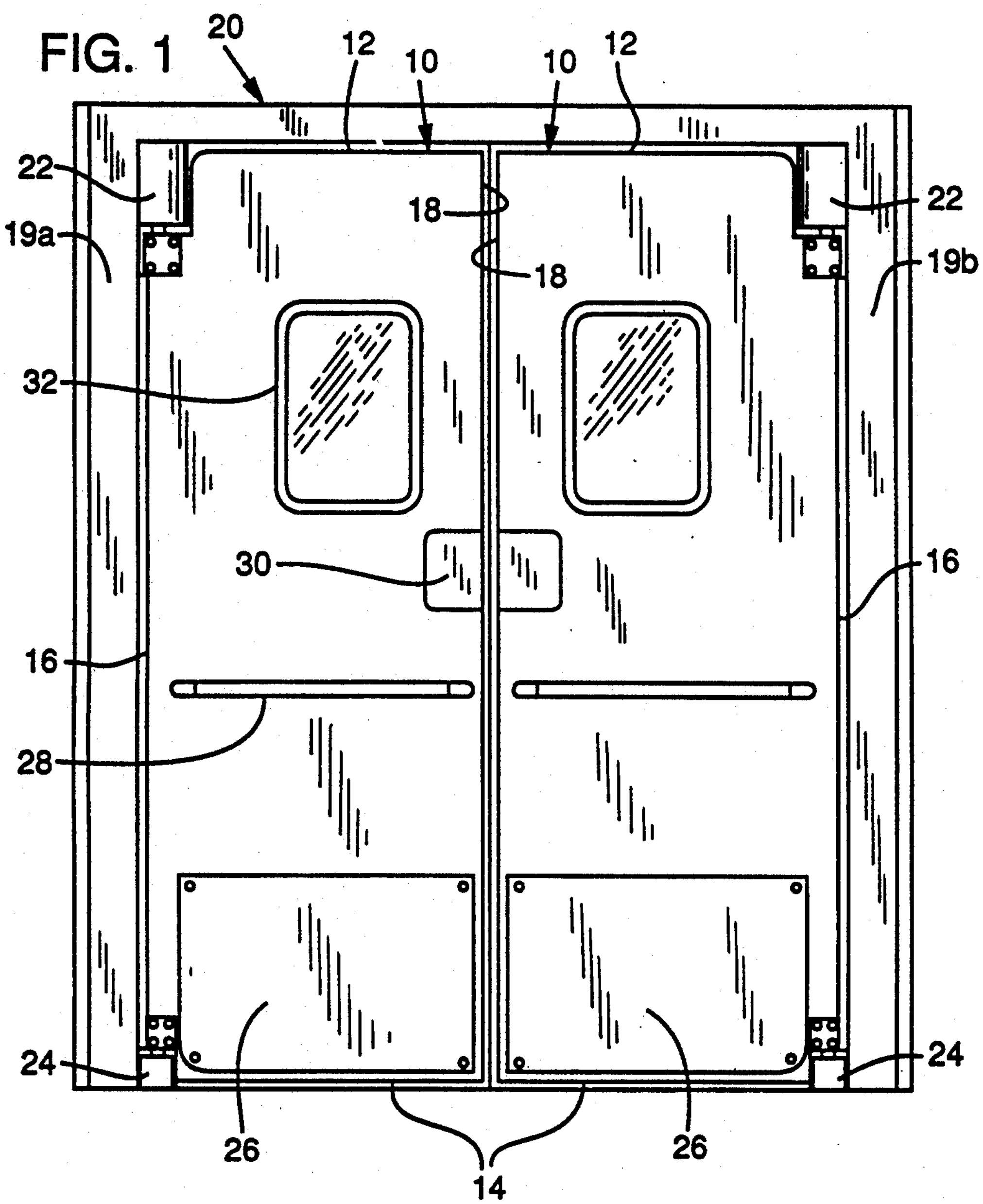
FIG. 1 is a front elevational view of an embodiment of the entire invention showing a double door installation.

FIG. 1 illustrates a pair of hinged, swinging, double-action insulated doors 10, each door having a top edge 12, a bottom edge 14, a hinge edge 16 and a swinging edge 18. The doors are attached at their hinge edges to opposing vertical members 19*a*, 19*b* of a door frame 20. Each door is attached to the door frame by an upper hinge assembly 22 attached to the hinge edge of the door near the top edge, and by a lower hinge assembly 24 attached to the hinge edge of the door near the bottom edge.

As illustrated, each door 10 may be provided with a rectangular sheet metal kick panel 26 substantially covering the surface of a portion of the door nearest the bottom edge 14 of the door. Each door may also be provided with a rub strip 28 which provides a raised, elongated ridge to protect the surface of the door from damage by carts and trucks. Each door is further preferably provided with a small rectangular sheet metal push panel 30 positioned at the swinging edge of the door at an intermediate height where the user's hand would typically reach to push the door open. Each door may also be provided with a rectangular window 32 which is positioned in the door at a height corresponding to a typical eye level of a user.

Generally speaking, the door 10 preferably comprises a rigid, planar substructure or door body or core 40 surrounded by an elongated edge rail 60 which retains an elongated, flexible gasket 90 which extends about the perimeter of the door. The planar sides of the door are covered by durable surface sheets or face panels 110.

Figure 2:
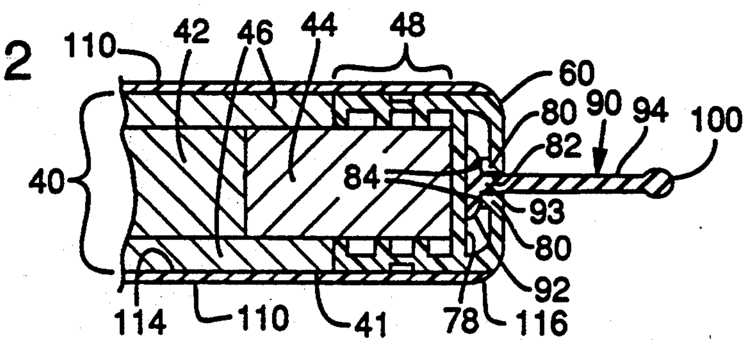
FIG. 2 is an enlarged cross sectional detail of the embodiment of FIG. 1 at a point along the perimeter of the door.

The door body or core 40 is best illustrated in FIG. 2 which shows a cross section of the periphery of the door. The core provides a rigid substructure for the door and is rectangularly shaped and substantially coextensive therewith. The center of the core is formed by a central panel portion 42 formed of a rigid insulating material such as urethane foam. The central panel portion is planar with a rectangular periphery, and has parallel sides separated by sufficient thickness to provide adequate insulation, preferably about three quarters of an inch. The central panel portion is substantially coextensive with the door surface. The central panel portion is surrounded by a frame or edge margin 44 formed by a rigid material such as wood. The edge margin has a thickness equal to the central panel portion thickness and provides a rectangular shape which surrounds the periphery of the central panel portion. Together the central panel portion and the edge margin form a panel and margin assembly.

Attached to the sides of the panel and margin assembly in a sandwich configuration are rigid structural panels or first and second opposed major surfaces 46 formed of a material such as wood. The major surfaces are rectangular and sized in each dimension to be slightly larger than the central panel portion and slightly smaller than the panel and margin assembly so that a portion of the edge margin 44 is revealed on all edges of the core, and so that the central panel portion is entirely covered by the first and second opposed major surfaces. The revealed amount of the edge margin forms a tongue 48 having an equal length on all sides of the door body, preferably between about three quarter inches and one and one-half inches. The thickness of the tongue is a first thickness generally equal to the thickness of the central panel portion and which is substantially less than the second thickness of an adjacent edge portion 41 of the periphery of the door body or core.

Figure 3:
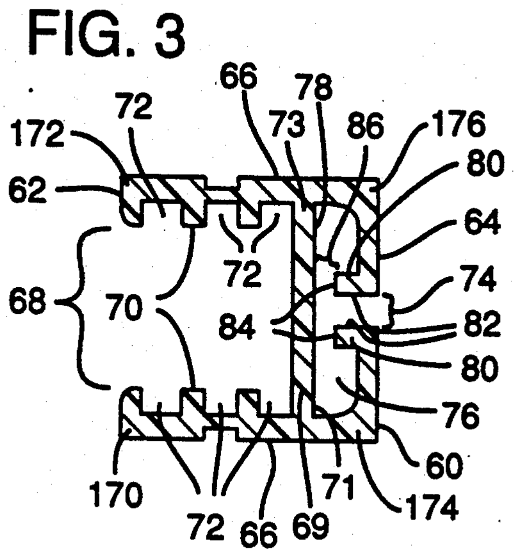
FIG. 3 is an enlarged cross sectional view of the edge rail shcwn in FIG. 2.

Received on the tongue on all edges of the door is an edge rail 60 which may be bent to encompass all sides of the door or, alternatively, segmented to cover at least one and preferably all edges. As shown in FIG. 3, the rail is an extruded, rigid and resilient structure preferably formed of plastic. Generally speaking, the rail has a planar base 69 which forms an elongated strip around the periphery of the edge margin 44. The base has first and second edges 71, 73 edges corresponding to each surface of the door. From each edge, extending generally perpendicular to the plane of the base and in a first direction toward the core of the door are a pair of spaced-apart elongated core engaging flanges 170, 172. The flanges have respective opposed interior surfaces 70 and exterior surfaces 66. The interior surfaces of the flanges define a core receiving channel 68 therebetween. The rail also includes first and second gasket engaging flanges 174, 176 projecting outwardly from the base in a second direction opposed to the first direction. The gasket engaging flanges are spaced apart so as to define an elongated gasket receiving slot 74 therebetween.

The edge rail has an inner surface 62 which faces in the first direction inwardly toward the door body and is proximal to the edge of the first and second opposed major surfaces 46. The edge rail has a smooth peripheral face or perimeter surface 64 which faces in the second direction away from the door body and is generally parallel to the inner surface. The exterior surfaces 66 on opposite sides of the edge rail are perpendicular to the inner surface 62 and the perimeter surface 64 and parallel to each other. The side surfaces are separated by a distance which is the overall thickness of the edge rail and is equal to the overall thickness of the door body 40.

The core receiving channel has a width generally slightly less than or equal to the thickness of the tongue 48 and a depth generally equal to the length of the tongue or the distance by which the edge margin 44 extends beyond the major surfaces 46 of the core 40. The opposed interior surfaces 70 are parallel to each other, each being parallel to and corresponding to an exterior surface 66. The interior surfaces are separated by a distance slightly less than or equal to the thickness of the tongue to provide a secure fit. The interior surfaces are provided with a plurality of elongated grooves 72 formed therein, each groove being rectangular in cross section and running the length of the rail. The remaining portions of the interior surfaces between the grooves serve as gripping elements. Alternatively, gripping elements may be formed by an alternative surface such as a molded texture or raised dots. The edge rail receives the tongue 48 of the core 40 within the gap 68 and is affixed thereto by adhesive, excess amounts of which can be retained by and flow through the grooves 72.

The gasket receiving slot 74 is defined in the median of the perimeter surface 64 of the edge rail 60 and runs along its length. The slot is preferably about one-eighth of an inch wide and communicates with a gasket retaining channel 76 formed generally beneath the perimeter surface 64 and extending to within about one-eighth of an inch of each exterior surface 66. The channel has a flat bottom surface 78 which is the surface of the base 69 facing outwardly in the second direction. The slot 74 is defined by slot walls 80 which are parallel to the exterior surfaces 66 and extend inwardly, into the gasket retaining channel 76 away from the perimeter surface 64. The slot walls have parallel slot surfaces 82 facing inwardly in the first direction and defining the gasket receiving slot 74. The slot walls are terminated by wall ends 84 which face the bottom surface 78 and are separated therefrom by a cross bar gap 86, preferably of approximately one-eighth of an inch.

Figure 4B:
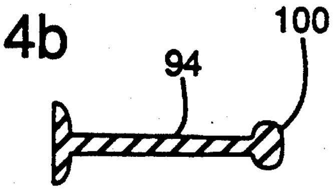
FIGS. 4a-4c are enlarged cross sectional view of alternative forms of leaf gaskets suitable for use with the embodiment of FIG. 1.
Figure 4A:
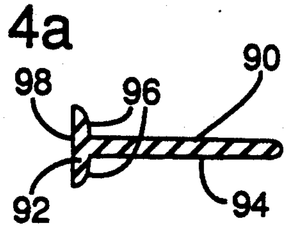
Figure 4C:
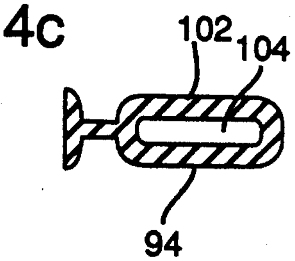

As shown in FIG. 4*a*, an elongated leaf gasket 90 has a T-shaped cross section. A widened portion 92 forms a cross bar of the T and an outer portion 94 joins the cross bar perpendicularly at a medial location thereon. The cross bar has a convexly curved cross bar surface 96 on each side of the outer portion facing the direction of the outer portion. The cross bar has a flat surface 98 on the side of the cross bar opposite the cross bar surfaces. An alternative embodiment shown in FIG. 4*b* illustrates the outer portion 94 as being terminated in an enlarged bead 100. A further alternative is shown in FIG. 4*c* which shows the outer portion 94 forming a flattened loop 102 defining a narrow cavity 104.

As shown in FIG. 2, the gasket 90 is removably and replaceably received in the gasket slot 74 so that the widened portion 92 is held between the wall ends 84 and bottom surface 78. A root portion 93 of the outer portion 94 nearest the cross bar 92 is thereby received between the slot surfaces 82 of the slot walls 80 defining the gasket slots 74. The remaining outer portion 94 extends perpendicularly in the second direction from the perimeter surface 64 of the edge rail 60.

The door 10 is provided with surface sheets of first and second face panels 100, each having an outer surface 112 preferably textured to resist damage and to present an attractive, durable surface. Each sheet has a flat interior surface 114. These panels are formed of a durable, resilient material such as plastic and are sized and shaped to overlay the entire surface of the core 40 and edge rail exterior surfaces 66. The face panels are adhered to the first and second opposed major surfaces 46 and the exterior surfaces 66 of the edge rails 60 by a suitable means such as gluing so that the core 40 and edge rail exterior surfaces 66 are completely covered.

The joint between the edge rail 60 and the face panels 110 is smoothly transitioned from the panel faces to the perimeter surface 64 of the edge rail. This may be corner and provides a rounded or beveled edge.

Figure 5:
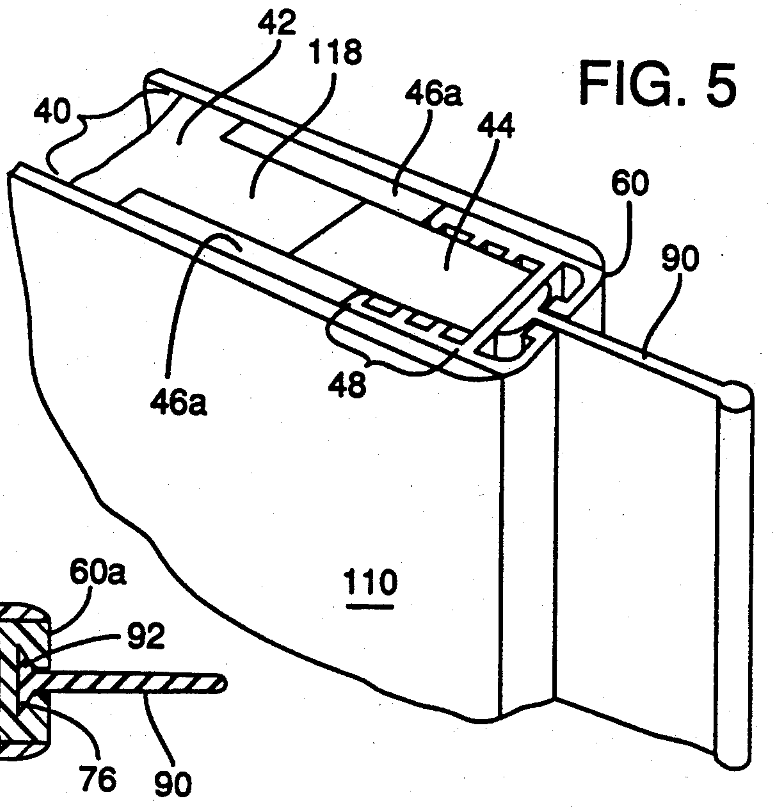
FIG. 5 is an enlarged sectional isometric view of the embodiment of FIG. 1 at a point along its perimeter.

FIG. 5 illustrates a door having a door body made substantially of insulating foam. In this embodiment, the insulating central panel portion 42 has a thickness equal to the total thickness of the door body or core 40 and has a peripheral central panel portion tongue 118 extending laterally from all edges, the tongue having a thickness slightly greater than or equal to the edge rail gap 68. Modified first and second opposed major surfaces 46*a* comprise rectangular, frame-shaped bands which cover and extend beyond the central panel portion tongue 118 in peripheral directions so that the edge margin 44 may be received therebetween to abut the central panel portion tongue and extend beyond the surfaces 46*a* to be received by the edge rail 60. In this embodiment, the face panels 110 are affixed directly to the surface of the insulating central panel portion 42 in the area within the frame-shaped bands.

Figure 6:
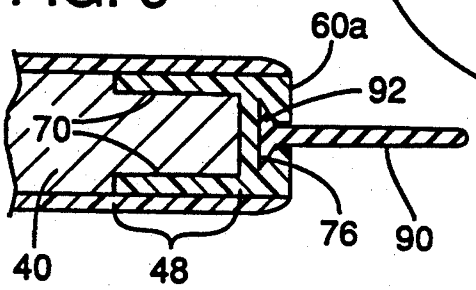
FIG. 6 is an enlarged cross sectional view of the embodiment of FIG. 1 in which the edge rail does not have protruding ribs.

FIG. 6 illustrates a simplified edge rail 60*a*having opposed interior surfaces 70 which are free of grooves or raised ribs. The elongated gasket retaining channel 76 is a reduced size to closely receive the widened portion 92 of a gasket 90.

Figure 7:
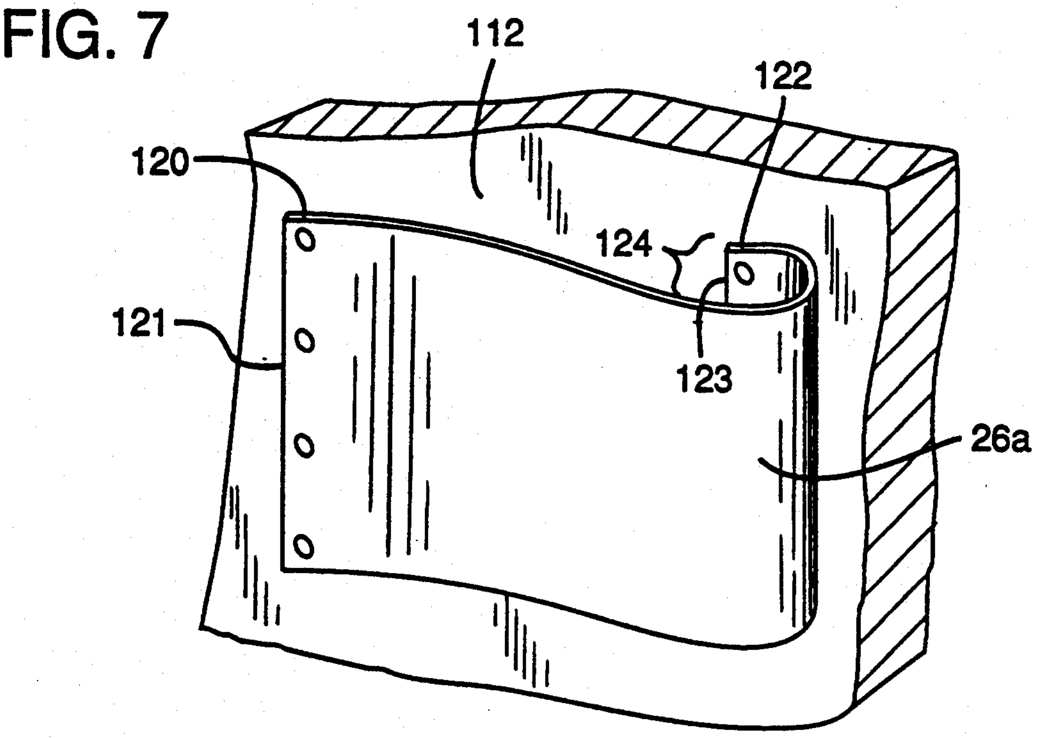
FIG. 7 is a front elevational view of a kick panel suitable for use with the embodiment of the invention.

FIG. 7 illustrates a compressible kick panel 26 usable in the present invention. The kick panel is formed of a sheet metal spring having a J-shaped cross section. The J has a straight end 120 and a curved end 122. The ends correspond to vertically oriented edges 121, 123 which are attached to the lower portion of the surface of a door 10 by suitable means such as screws. The panel curves outwardly away from the surface of the door at the curved end, forming a space 124 between the panel and the surface of the door 112. Consequently, the kick panel will absorb the shock of impacts to the door such as those that occur when a cart or truck forces the door open.

Figure 8:
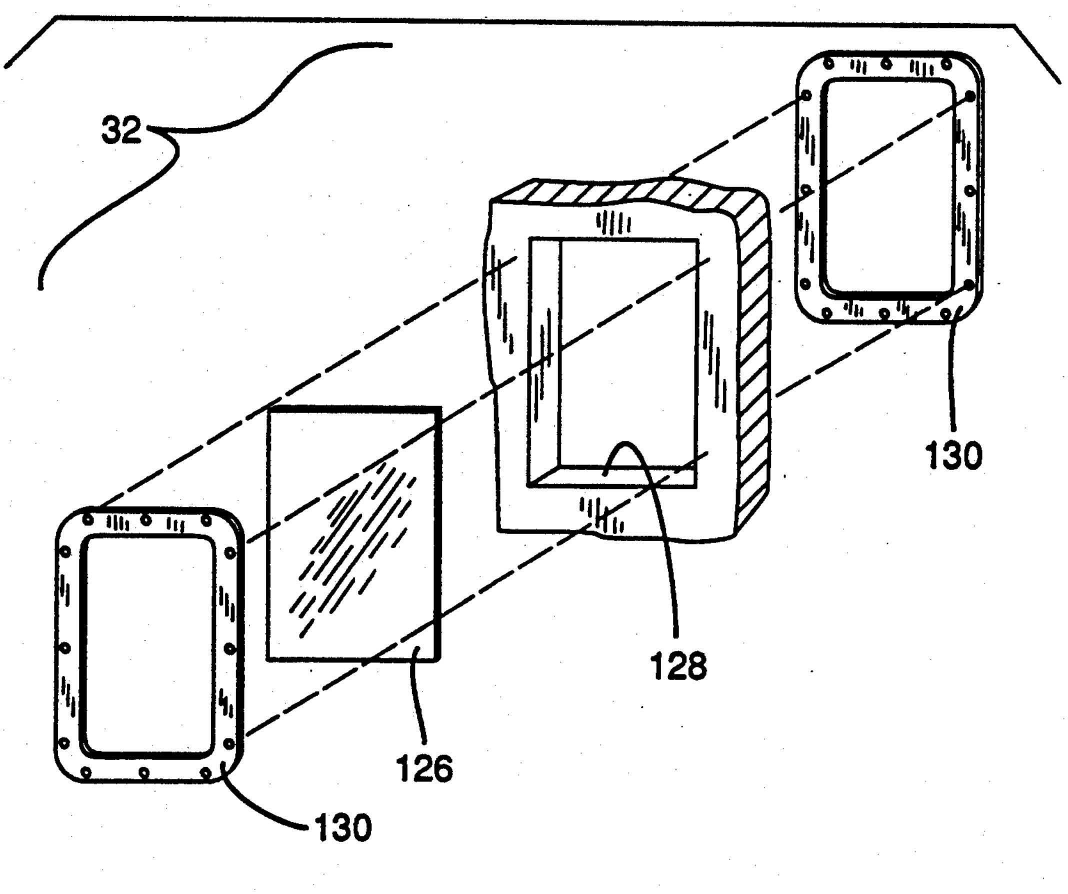
FIG. 8 is an exploded front elevational view of the window assembly of the embodiment of FIG. 1.

FIG. 8 illustrates an exploded view of a window assembly 32 suitable for use with the present invention. The window assembly includes a transparent pane 126 shaped and sized to fit within a rectangular aperture 128 formed in the door, the assembly also including a pair of window frames 130 positioned on opposite sides of the door. The frame has a flat portion 132 which is secured to the surface of the door 112 by suitable means such as screws 134. The frame has a bent portion 136 which is bent inwardly toward the center of the door and terminates in a window frame edge 138 which contacts and retains the transparent pane 126 which is preferably formed of a suitable material such as glass or polycarbonate.

Figure 9:
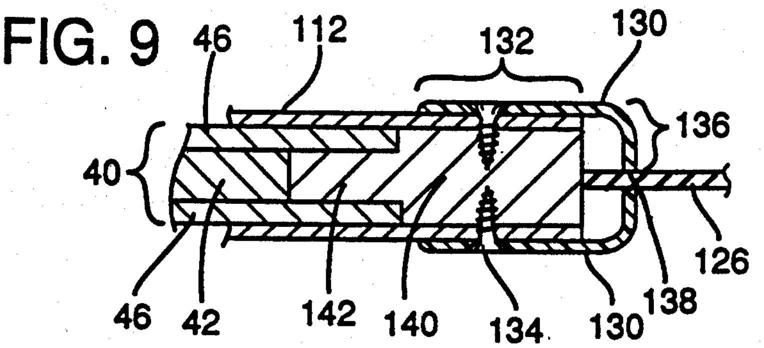
FIG. 9 is an enlarged sectional view of the embodiment of FIG. 1 showing the window assembly detail.

As shown in FIG. 9, the portion of the door surrounding the aperture 128 includes an aperture substructure 140 formed of a rigid material such as wood. The substructure has a thickness equal to that of the door body or core 40 and a window frame tongue 142 extending peripherally from the aperture substructure, the tongue being received between the structural panels 146 and abutting the insulating core 142, the insulating core being recessed to create a gap between the structural panels for receiving the window aperture tongue 142.

Figure 10:
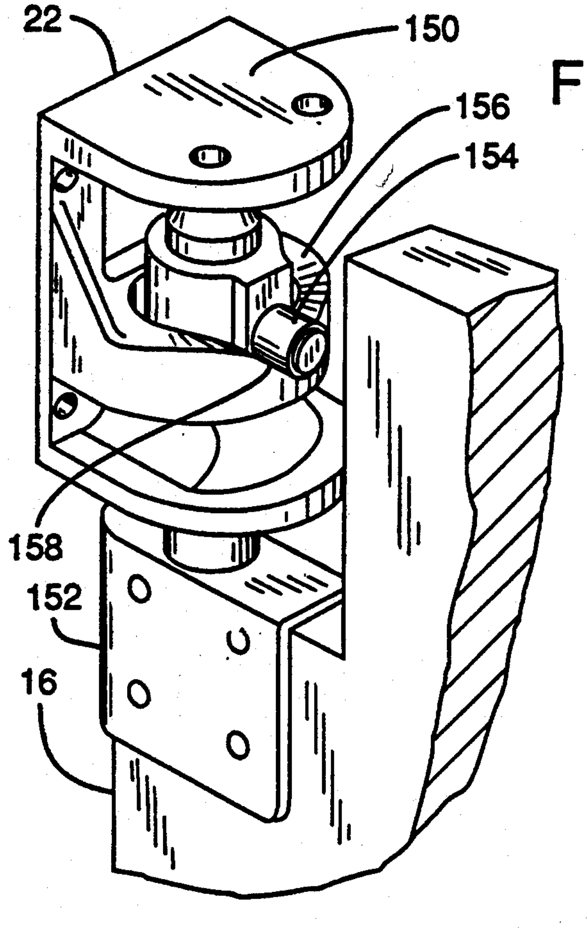
FIG. 10 is an enlarged isometric view of the upper hinge assembly of the door shown in FIG. 1.
Figure 11:
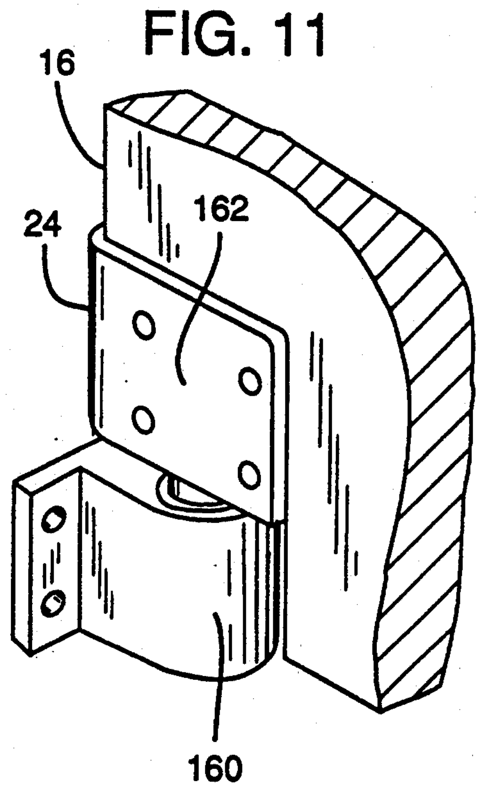
FIG. 11 is an enlarged isometric view of the lower hinge assembly of the door shown in FIG. 1.

FIGS. 10 and 11 together illustrate hinge mechanisms for providing a two-way, self closing door. While other mechanisms may be used, the illustrated hinges are preferred. The mechanisms are disclosed in detail in U.S. patent application Ser. No. 07/375,257 to Lon H. McCarty, filed on Jun. 30, 1989 and entitled "Gravity Swing Door Hinge" and are incorporated by reference herein.

FIG. 10 illustrates the upper hinge assembly 122, the hinge having a fixed portion 150 affixed to a door frame (not shown) and a swinging portion 152 affixed to the hinge edge 16 of the door 10 proximate to the upper edge 12. The swinging portion is journaled in the fixed portion and includes a cylindrical cam follower 154 which follows a cam surface 156 which is integrally formed with the fixed portion. The cam surface faces generally upward and slopes downward to a detent 158 which the cam will seek as the door is under the force of gravity. The door will thereby be self-closing. When the cam is in the detent position the door will be in a closed position.

FIG. 11 illustrates the lower hinge assembly 24 Which includes a lower fixed portion 160 attached by suitable means such as screws to a door frame 20 (not shown), the assembly also includes a lower swinging portion 162 above the lower fixed portion 160 and journaled therein, the hinged portion being attached to the door 10 at a lower portion of the hinge edge 16 proximate to the lower edge 14. The hinge assemblies permit the door to swing both directions as a double action door.

Figure 12:
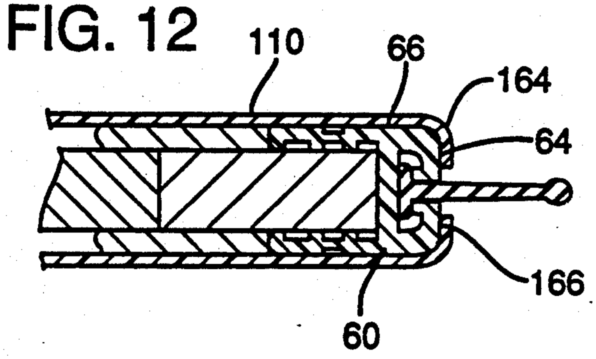
FIG. 12 is a sectional top view of an alternative embodiment construction.

In the illustrated embodiment of FIG. 12 the surface sheets 110 are formed of sheet metal and are bent at bends 164 which correspond to the corners formed by the exterior surfaces 66 and perimeter surface 64 of the edge rail 60. The bends each form a flange 166 which substantially covers the perimeter surface of the edge rail.

In the foregoing it will be apparent that the described door is capable of use in high traffic industrial areas where insulation and environmental isolation are required, and that the gasket is secured against unintended removal.

Figure 13:
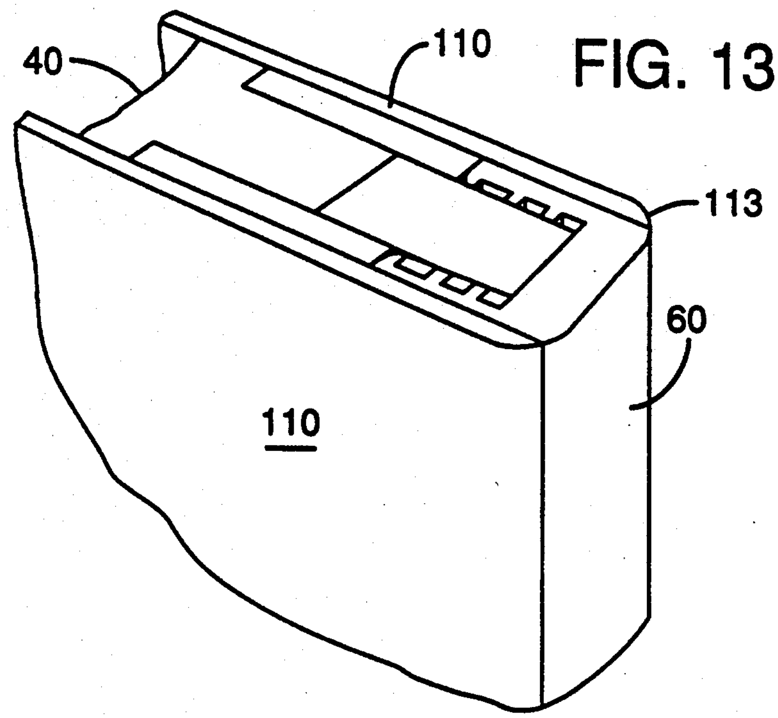
FIG. 13 is an enlarged sectional isometric view of an embodiment of the invention in which no gasket is provided and the edge rail does not have an edge gap.
Figure 14:
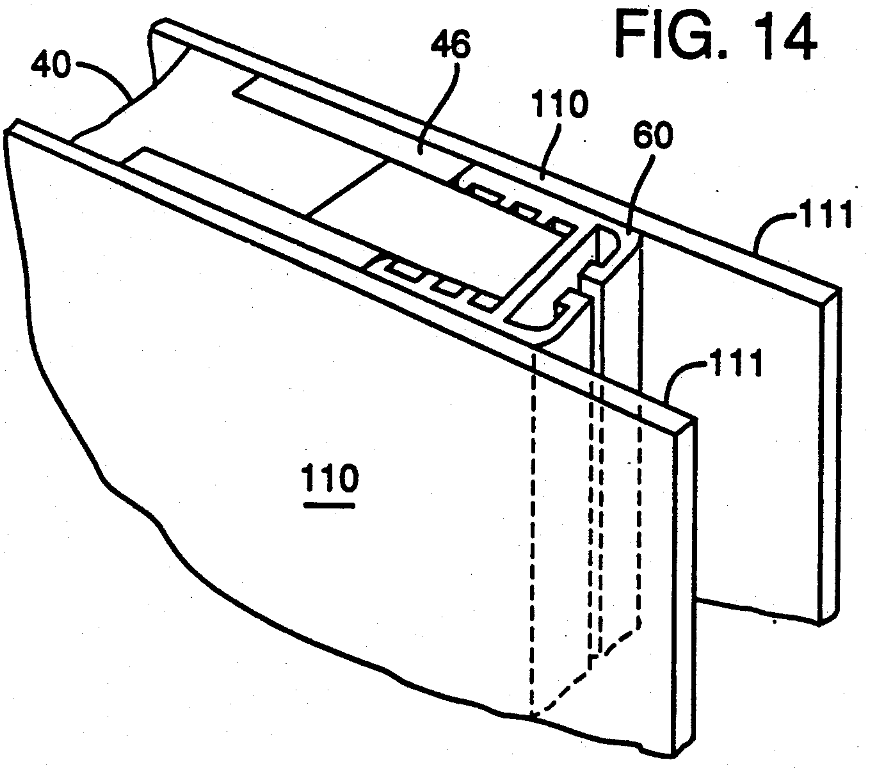
FIG. 14 is an enlarged sectional isometric view of the embodiment of FIG. 1 which illustrates the partially manufactured door before excess portions of the surface sheets are trimmed.

The method of making the door described above comprises several steps. The edge rail 60 is mounted to at least one peripheral edge section of the core 40 of the door 10, mounting first and second face sheets or panels 110 to the respective first and second opposed major surfaces 46 of the core. As shown in FIG. 14, The face sheets are sized to extend beyond the edge rail on all sides, with the edge rail positioned therebetween. The excess portions 111 of the face sheets which extend beyond the edge rail are substantially removed by suitable means such as sawing to present a generally rough, sharp corner. As shown in FIG. 13, this corner is then transitioned to a non-angled configuration such as a radius 113 or beveled edge by suitable means, such as routing, grinding, sanding or sawing. The radiusing step preferably removes material both from the face sheet and from a corner of the edge rail so that a smooth transition is provided therebetween.

Having illustrated and described the principles of our invention by what is presently a preferred embodiment, it should be apparent to those persons skilled in the art that the illustrated embodiment may be modified without departing from such principles. We claim as our invention not only the illustrated embodiment, but all such modifications, variations, and equivalents thereof as come within the true spirit and scope of the following claims.

I claim:

1. A method of making a door comprising:
   mounting an edge rail to at least one peripheral edge section of a core of a door, the core having first and second opposed major surfaces;
   mounting first and second face sheets to the respective first and second major surfaces, the face sheets being sized to extend beyond the edge rail with the edge rail positioned therebetween; and
   cutting the face sheets along the edge of the rail to define the edge of the door.

2. A method according to claim 1 comprising the step of cutting a portion of the rail and the face sheets to define the edge of the door.

3. A method according to claim 1 comprising the step of routing a portion of the edge rail and face sheets to define the edge of the door.

4. A method according to claim 1 in which each face sheet terminates at a corner including the step of transitioning the corner of the edge of the door to a non-angled configuration.

5. A method according to claim 1 comprising the step of chamfering the corner of the door edge to provide a beveled edge.

6. A method according to claim 5 wherein the step of chamfering includes removing material from the rail and from the face sheets.

7. A method according to claim 1 comprising the step of radiusing the corner of the door edge to provide a rounded edge.

8. A method according to claim 7 wherein the step of radiusing includes removing material from the rail and from the face sheets.

9. A method of making a door comprising:
   mounting an edge rail to at least one peripheral edge section of a core of a door, the core having first and second opposed major surfaces;
   mounting first and second face sheets to the respective first and second opposed major surfaces, the face sheets being sized to overlap at least a portion of the edge rail with at least a portion of the edge rail positioned therebetween, and
   cutting at least a portion of the face sheets and at least a portion of the rail to define the edge of the door.

10. The method of claim 9 wherein the step of cutting comprises chamfering the sheets and rail to provide a beveled edge.

11. The method of claim 9 wherein the step of cutting comprises radiusing the sheets and rail to provide a rounded edge.

* * * * *

UNITED STATES PATENT AND TRADEMARK OFFICE

CERTIFICATE OF CORRECTION

PATENT NO. : 5,191,704

DATED : March 9, 1993

INVENTOR(S) : Lon H. McCarty

It is certified that error appears in the above-identified patent and that said Letters Patent is hereby corrected as shown below:

Column 1, line 15
"4,76,700" should read --4,716,700--.

Column 1, line 20 (application page 1, line 14), "jamb" should read --jamb.--.

Column 1, line 27 (application page 1, line 21), "helo" should read --held--.

Column 2, line 67 (Amendment dated August 19, 1992, page 1, paragraph 2, line 2-3), "view" should read --views--.

Column 5, page 25
"inwardly, into" should read --inwardly into--.

Column 5, line 56
1992, page 1), "100" should read --110--.

Column 6, lines 1,2
15-17; Amendment dated November 12, 1992, page 1), "This may be corner" should read --This may be provided by a radius or chamfer (116, Fig. 2) which eliminates a sharp corner--.

Column 6, line 25
1992, page 1), "26" should read --26a--.

Column 6, line 59 (Amendment dated November 12, 1992, page 1), "146" should read --46--.

UNITED STATES PATENT AND TRADEMARK OFFICE
CERTIFICATE OF CORRECTION

PATENT NO. : 5,191,704 Page 2 of 2

DATED : March 9, 1993

INVENTOR(S) : Lon H. McCarty

It is certified that error appears in the above-identified patent and that said Letters Patent is hereby corrected as shown below:

Column 6, line 59
page 1), "142" should read --42--.

Column 7, line 64
"Which" should read --which--.

Column 8, line 13
"second major" should read --second opposed major--.

Signed and Sealed this

Ninth Day of May, 1995

Attest:

BRUCE LEHMAN

*Attesting Officer* *Commissioner of Patents and Trademarks*